United States Patent
Ferguson, III et al.

(10) Patent No.: US 6,820,454 B2
(45) Date of Patent: Nov. 23, 2004

(54) "S" SHAPED CAST IN WIRE (75) Inventors: Otto Ferguson, III, Oakwood Village, OH (US); Dennis K. Hartman, Olmsted Township, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/633,215

(22) Filed: Aug. 1, 2003

(65) Prior Publication Data

US 2004/0020041 A1 Feb. 5, 2004

Related U.S. Application Data

(62) Division of application No. 10/107,499, filed on Mar. 26, 2002, now Pat. No. 6,708,864
(60) Provisional application No. 60/298,555, filed on Jun. 15, 2001.

(51) Int. Cl.[7] .............................................. B21C 23/00
(52) U.S. Cl. ................................. 72/256; 72/79; 72/371
(58) Field of Search ........................... 72/79, 138, 139, 72/142, 143, 160, 164, 256, 371; 140/147

(56) References Cited

U.S. PATENT DOCUMENTS

| | | | |
|---|---|---|---|
| 1,907,051 A | | 5/1933 | Emery |
| 3,185,185 A | | 5/1965 | Pfund |
| 3,565,129 A | | 2/1971 | Field |
| 3,576,966 A | | 5/1971 | Sullivan |
| 3,595,277 A | * | 7/1971 | Lefever ...................... 140/147 |
| 3,724,249 A | | 4/1973 | Asbeck |
| 3,748,435 A | * | 7/1973 | Reynolds ................. 219/137.8 |
| 4,044,583 A | | 8/1977 | Kinney, Jr. |
| 4,074,105 A | | 2/1978 | Minehisa et al. |
| 4,172,375 A | * | 10/1979 | Rushforth et al. ............ 72/137 |
| 4,188,526 A | | 2/1980 | Asano |
| 4,254,322 A | | 3/1981 | Asano |
| 4,464,919 A | * | 8/1984 | Labbe ......................... 72/162 |
| 4,546,631 A | | 10/1985 | Eisinger |
| 4,949,567 A | * | 8/1990 | Corbin ........................ 72/164 |
| 6,301,944 B1 | * | 10/2001 | Offer .............................. 72/79 |
| 6,708,864 B2 | | 3/2004 | Ferguson, III et al. |

FOREIGN PATENT DOCUMENTS

| | | | |
|---|---|---|---|
| FR | 2055181 | 4/1971 | |
| FR | 2 055 181 | 5/1971 | |
| JP | 58-035068 | 3/1983 | |
| JP | 60-021181 | 2/1985 | |
| JP | 60-184422 | * 9/1985 | ................. 72/201 |
| JP | 61-293874 | 12/1986 | |
| JP | 62-009774 | 1/1987 | |
| JP | 62-287055 | 12/1987 | |

* cited by examiner

Primary Examiner—Ed Tolan
(74) Attorney, Agent, or Firm—Fay, Sharpe, Fagan, Minnich & McKee (57) ABSTRACT

A weld wire for storage on a spool of weld wire. The weld wire has a substantially linear cast in the form of an undulating curve that generally lies in a single plane. The undulating curve is a succession of generally semi-circular sections having a generally fixed radius of curvature. The linear cast is formed on the weld wire prior to the weld wire being wound on the spool of weld wire. The linear cast is at least partially retained on the weld wire after the weld wire is unwound from the spool and during the feeding of the weld wire through a welding machine.

25 Claims, 7 Drawing Sheets

"S" SHAPED CAST IN WIRE

This patent application is a division of and claims priority on U.S. application Ser. No. 10/107,499 filed Mar. 26, 2002 now U.S. Pat. No. 6,708,864 entitled "'S' Shaped Cast In Wire", which in turn claims priority on U.S. Provisional Application Ser. No. 60/298,555 filed Jun. 15, 2001, entitled "'S' Shaped Cast In Wire."

The present invention pertains to the art of welding, and more particularly to welding wires used in welding machines.

INCORPORATION BY REFERENCE

U.S. Provisional Application Ser. No. 60/298,555 filed Jun. 15, 2001 entitled "'S' Shaped Cast In Wire" is incorporated herein by reference.

BACKGROUND OF THE INVENTION

One of the lingering problems in the field of welding is the consistent formation and placement of a quality weld bead. Various measures have been employed to achieve this goal. For instance, the waveform of the welding current has been closely controlled to achieve better weld bead formation and weld bead quality. In addition, the feed rate of a weld wire has been controlled to produce a higher quality weld bead. The composition of the consumable weld wire and various types of shielding gases used during the welding process have been employed to achieve higher quality weld beads. Although many of these techniques have significantly improved weld bead quality, consistent weld bead placement on a workpiece has remained illusive.

One of the remaining problems with obtaining a consistent weld bead placement on a workpiece is the position of the weld wire relative to the workpiece as the weld bead is being formed. It has been found that when the position of the tip of the weld wire varies relative to the welding tip of a welder, the consistency of the weld bead placement degrades. It is common industry practice to feed a "killed" weld wire to a welder during the welding process. A "killed" weld wire is a weld wire that has had its shape memory removed prior to the weld wire being wound onto a reel, spool, container, or the like. When the weld wire is wound on the reel, spool, container, or the like, the weld wire adopts a new shape as it is being wound. When the weld wire is unwound from the reel, spool, container, or the like, the weld wire adopts a new shape during the unwinding process. As a result, the shape of the unwound wire will vary along the longitudinal length of the unwound weld wire. Once the unwound weld wire is cut into various sections, the unwound wire retains its adopted shape obtained when being unwound from the reel, spool, container, or the like. Further modifications to the shape of the weld wire can result during the cutting process and/or while the weld wire is positioned for being cut and/or as the weld wire is fed into the welding machine. Since the weld wire has no memory, the weld wire constantly modifies its shape as it passes through the weld gun, thus resulting in inconsistent positioning of the weld wire as it exits the welding tip of the welding gun or torch. This inconsistent positioning of the weld wire results in inconsistent placement of the weld bead onto a workplace.

Various techniques have been used by operators to minimize this attribute of the weld wire. One technique is for the operator to cut the weld wire in certain positions relative to the unwound weld wire to obtain a desired weld wire profile for the cut weld wire section. The operator can further modify the shape of the weld wire by hand as he/she deems fit. Although these techniques can improve weld bead placement on a workpiece, the weld bead placement consistency varies widely between operator and from the use of different cut sections of the weld wire.

When the weld wire is automatically fed into a welding machine, such as in a robotic welder, problems with consistent weld bead placement can be severe. Typically, robotic welders follow a predefined path when forming a weld bead. The varying position of the weld wire as it exits the welding tip of the robotic welder can cause significant weld bead placement deviation during the welding process. During manual welding, the operator has the ability to attempt to correct and/or compensate for weld bead placement; however, such techniques are inapplicable to robotic welders.

In addition to the problems associated with the use of "killed" wire in obtaining consistent weld bead placement, the "killed" wire is more susceptible to bending and the formation of kinks in the weld wire as the weld wire travels through the weld gun, thereby resulting in undesired weld bead placement and the possibility of a low quality weld bead.

In view of the persistent problems of weld bead placement during a welding operation, there is a demand for an improved weld wire which addresses the problem associated with consistent weld bead placement onto a workpiece.

SUMMARY OF THE INVENTION

The present invention pertains to an improved weld wire and a process for making the improved weld wire for use in various types of welding machines. These welding machines can include automated welders and manual welders. In addition, the weld wire can be used in various types of welding processes such as MIG, MAG, or STT welding, or in other types of welding processes wherein a consumable electrode is utilized to form a weld bead onto a workpiece. The improved weld wire in accordance with the present invention involves the utilization of a weld wire that has a shape memory imparted onto the weld wire prior to and/or at the time the weld wire is wound onto a reel, spool, container, or the like, and which shape memory is fully or partially retained by the weld wire as the weld wire is unwound from the reel, spool, container, or the like. The use of weld wire with a shape memory is a deviation from common industry practice that teaches that weld wire that is fed into a welding machine should have little or no shape memory. The common practice in the industry was to "kill" the wire or otherwise remove the shape memory of the wire prior to winding the weld wire onto a reel, spool, container, or the like. It was commonly believed that a weld wire having a shape memory would adversely affect the unwinding of the weld wire from the reel, spool, container, or the like during the welding process and would further be more susceptible to kinks, bends and other problems as the weld wire is fed through the welder during the welding process. Furthermore, it was commonly believed that a weld wire with shape memory would aggravate the problem associated with consistent weld bead placement. Surprisingly, the use of a shape memory weld wire in accordance with the present invention results in the formation of a weld bead having better consistent placement during the welding operation and the formation of higher quality weld beads than weld beads formed by "killed" weld wires. The use of a weld wire with shape memory has also been found to form a more robust weld bead during the welding process. Furthermore, the use of a weld wire with shape memory has been found to reduce the occurrence of bends and kinks in the welding wire as it is being cut for use during the welding process and/or during the feeding of the weld wire through a welding machine during the welding process. It has also been found that the use of a weld wire with shape memory reduces or substantially eliminates the operator's control over the weld wire shape. In the past, weld wire that has been "killed" could be cut at various locations to help improve the weld bead placement. However, the shape of the cut weld wire was inconsistent from one operator to the next, and furthermore the shape of the weld wire was inconsistent from one cut section to another. As a result, the operator had significant control over the resulting consistency of weld bead placement. The use of a weld wire with shape memory in accordance with the present invention overcomes this inconsistency problem since similar cut weld wire sections will have substantially the same shape from one cut section to the next. In addition, the weld wire with shape memory will resist further shape modifications during the cutting process and as the weld wire is fed through a welder. Consequently, as the weld wire with shape memory is fed through the contact tip of a welding gun, the weld wire will be similarly positioned relative to the tip from one cut section to the next, thus forming a more consistent weld bead placement during the welding operation.

In accordance with the present invention, there is provided a weld wire with a predefined shape memory imparted onto the welding wire prior to the welding wire being wound onto a reel, spool, container, or the like. The shape memory of the weld wire is fully or partially retained by the weld wire as the weld wire is wound and unwound from a reel, spool, container, or the like and as the weld wire is fed through a welding machine. The shape memory on the weld wire can be formed from a variety of processes such as, but not limited to, a casting process. The shape memory imparted onto the weld wire can occur during the formation of the weld wire and/or by a process subsequent to the formation of the weld wire. In one embodiment, the weld wire is formed by an extrusion process wherein the weld wire is imparted a shape memory during the extrusion process. As can be appreciated, the weld wire can be formed by other processes. In one aspect of this embodiment, the desired shape memory of the weld wire is at least partially imparted onto the weld wire as the weld wire is formed by the extrusion process. In another aspect of this embodiment, the desired shape memory imparted onto the weld wire is formed subsequently to the formation of the weld wire by an extrusion process or by some other process. In this aspect, the shape memory imparted onto the weld wire during the formation of the weld wire can be partially or fully removed from the weld wire and subsequently the desired shape memory is then imparted on the weld wire by one or more processes, such as, but not limited to, a casting process.

In another aspect of the present invention, the desired shape memory imparted onto the weld wire is selected to maximize the consistency of weld bead placement on a workpiece. In one embodiment, the shape memory of the weld wire is imparted substantially in one plane along the longitudinal length of the weld wire. In one aspect of this embodiment, the cut weld wire, when laid upon a flat ground surface, rises above the flat ground surface less than about 6 inches, generally less than about 5 inches, typically less than about 4 inches, more typically less than about 3 inches, even more typically less than about 2 inches, and still even more typically less than about 1.5 inches. As can be appreciated, the less the weld wire deviates from the single plane, the better the consistency of weld bead placement typically obtained. In another embodiment, the shape memory imparted on the weld wire is in multiple planes. In this embodiment, the predefined shape of the shape memory on the weld wire has a repeating pattern which exists in multiple planes and which results in a more consistent weld bead placement during the welding process. In one aspect of this embodiment, the deviation from the predefined shape memory in multiple planes is less than about 6 inches, generally less than about 5 inches, typically less than about 3 inches, more typically less than about 2 inches, and even more typically less than 1.5 inches. As can be appreciated, better weld bead placement is typically obtained as the deviation from the desired shape memory that has been imparted onto the weld bead approaches zero.

In still another embodiment, the desired shape memory imparted onto the weld wire is a waveform; however, as can be appreciated, other shapes for the shape memory can be imparted onto the weld wire. In one aspect of this embodiment, the maximum amplitude of the waveform is substantially the same throughout the length of the cut section of the weld wire. The maximum amplitude of each half cycle of the cut weld wire can vary sightly depending upon the position of the weld wire on the reel, spool, container, or the like as it is being unwound from the reel, spool, container, or the like. Furthermore, the maximum amplitude of the half cycle of the cut weld wire can also vary depending on the weld wire diameter. Generally, the deviation of the maximum amplitude of each half cycle within one cycle of the cut weld wire varies less than about 6 inches, typically less than about 4 inches, more typically less than about 2 inches, and even more typically less than about 1 inch. As can be appreciated, the less deviation from maximum amplitude to maximum amplitude for each half cycle of the cut weld wire results in better consistency of weld bead placement typically obtained. In another aspect of this embodiment, the maximum amplitude of each half cycle of the cut weld wire is generally less than about 60 inches, typically 5–40 inches, more typically about 10–22 inches, and even more typically about 14–20 inches. As can be appreciated, other maximum amplitudes can be used for various types of welding operations. In still another aspect of this embodiment, the length of each cycle of the cut weld wire section is the same or substantially the same for adjacent positioned cycles. The length of each cycle of cut weld wire section can vary depending on the position of the weld wire as it is being unwound from a reel, spool, container, or the like. The diameter of the wire can also affect the length of each cycle of the cut weld wire section. Generally, the deviation of the length of each weld wire section is less than about 15 inches, typically less than about 10 inches, more typically less than about 6 inches, and even more typically less than about 5 inches, and still even more typically less than about 2 inches. As can be appreciated, the less deviation from the length of the cycle to the cycle of the cut weld wire, the better the consistency of the weld bead's position will be typically obtained. The length of each cycle of the cut weld wire sections will vary depending on the particular weld operation. Generally, the length of each cycle of the cut weld wire section is less than about 200 inches, and typically less than about 150 inches, and more typically about 40–120 inches, and even more typically about 50–100 inches, and still even more typically about 60–90 inches. As can be appreciated, other wire dimensions can be used. In still yet another embodiment of the present invention, the imparted shape memory on the weld wire creates a waveform for a cut section of the weld wire, wherein each half cycle has a substantially semi-circular shape, wherein each half cycle for each cycle of the cut weld wire section has substantially the same radius.

In still yet another aspect of the present invention, the shape memory imparted onto the weld wire is selected to improve the quality of the weld bead and facilitate in the formation of the weld bead. In one embodiment, the shape memory imparted onto the weld wire causes the weld wire to flip as the weld wire is fed through the welding tip of the welding gun. This flipping phenomenon results in the welding wire always being in the same or substantially in the same position relative to the welding tip as the welding wire is fed through the welding tip, thereby resulting in a more consistent position of the weld bead. The number of flips of the weld wire is typically dependent on the maximum amplitude of each cycle of the weld wire, the length of the cut section of the weld wire, the diameter of the weld wire, and the length of the cycles of the weld wire. In another embodiment, the shape memory imparted onto the weld wire inhibits or reduces the susceptibility of the weld wire being bent or otherwise kink as it is being unwound from a reel, spool, container, or the like and/or as the weld wire is fed through the weld gun or torch or other components of the welding machine. When the weld wire bends, kinks or otherwise does not properly feed through the welding machine during the welding process, the consistency of position of the weld bead and/or the quality of the weld bead can deteriorate. The use of the shape memory weld wire reduces such incidences since the imparted shape memory resists changes in such imparted shape, thereby improving the consistency of high quality weld beads and better ensuring consistent placement of the weld bead during the welding process. In still another embodiment, the shape memory imparted onto the weld wire facilitates in the heating of the weld wire at the welding tip of the welding gun. The imparted shape memory onto the welding wire causes the welding wire, as it travels through the welding tip of the welder, to engage the side of the welding tip prior to exiting the welding tip. This friction creates heat, which in turn facilitates in the melting of the tip of the weld wire during the welding process, thereby achieving a higher quality and more robust weld bead during the welding process.

It is the primary object of the present invention to provide an improved weld wire which obtains better placement consistency of the weld bead onto a workpiece.

It is another and/or alternative object of the present invention to provide a weld wire which has an imparted shape memory which lies in a substantially single plane.

It is still another and/or alternative object of the present invention to provide a weld wire which has reduced susceptibility to bending and/or kinks as the weld wire is unwound from a reel, spool, container, or the like and/or as the weld wire is fed through a welding machine.

It is yet another and/or alternative object of the present invention to provide a weld wire which facilitates in the heating of the weld wire during the welding process.

It is still yet another and/or alternative object of the present invention to provide a weld wire which forms a more robust weld.

It is a further and/or alternative object of the present invention to provide a weld wire which reduces inconsistency of shape when being cut into sections by an operator.

It is yet a further and/or alternative object of the present invention to provide a weld wire which can be successfully used in robotic welding to obtain consistent placement of the weld bead onto a predefined path on a workpiece.

It is still yet a further and/or alternative object of the present invention to provide a weld wire having a shape memory in the form of a waveform.

It is another and/or alternative object of the present invention to provide a weld wire which has a desired shape memory imparted on the weld wire after the weld wire has been formed and prior to the time the weld wire is wound onto a reel, spool, container, or the like.

These and other objects of the invention will become apparent to those skilled in the art upon reading and understanding the following detailed description of the preferred embodiments taken together with the drawings.

BRIEF DESCRIPTION OF THE DRAWINGS

The invention may take physical form in certain parts and arrangement of parts, preferred embodiments of which will be described in detail and illustrated in the accompanying drawings which form a part hereof and wherein.

DESCRIPTION OF THE PREFERRED EMBODIMENTS

Figure 1:
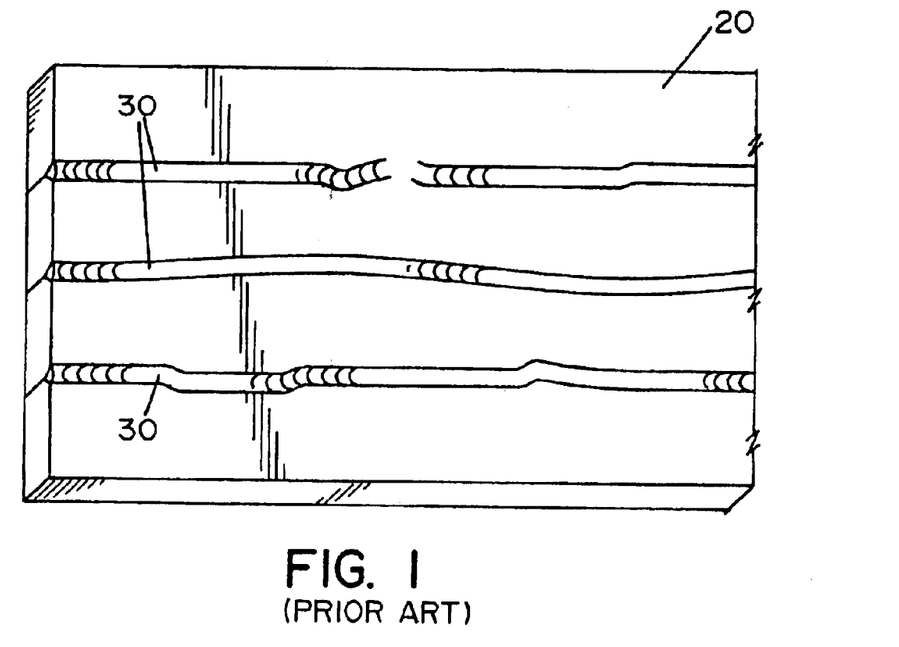
FIG. 1 is an illustration of a workpiece having a plurality of weld beads formed on the workpiece by prior art weld wires.
Figure 2:
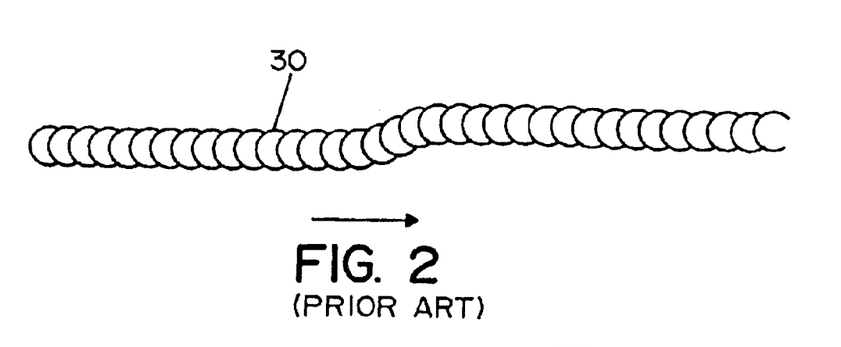
FIG. 2 is an illustration of a weld bead formed by a prior art weld wire.
Figure 3:
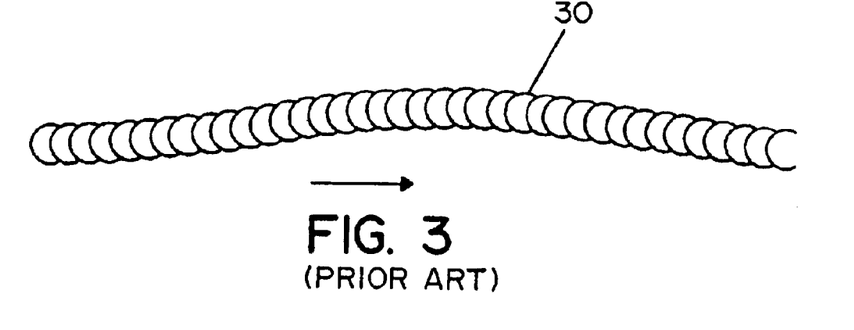
FIG. 3 is an illustration of another weld bead formed by another type of prior art weld wire.
Figure 7:
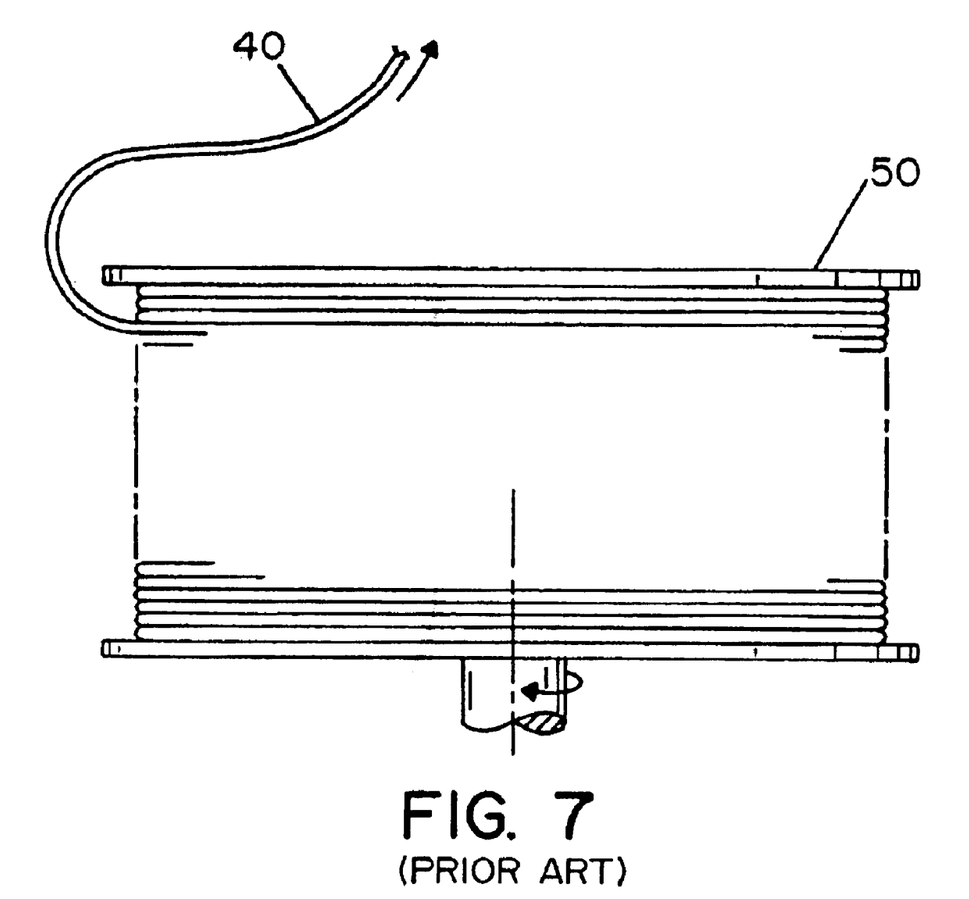
FIG. 7 illustrates a "killed" prior art weld wire being unwound from a spool.

Referring now to the drawings wherein the showings are for the purpose of illustrating the preferred embodiments only and not for the purpose of limiting the same, FIG. 1 illustrates a workpiece 20 which includes three weld beads 30 formed by "killed" prior art weld wires. As shown in FIG. 1, the desired weld bead path for each of the three weld beads was supposed to be linear in shape; however, due to the inconsistencies resulting from the weld wire's position as it exited the welding tip, the resulting weld beads had several deviations from the desired linear path. Referring now to FIGS. 2 and 3, enlarged views of the erratic weld bead path formed by prior art "killed" weld wire are illustrated. Common industry practice has taught that weld wire unwound from a spool should be "killed." In other words, the memory of the weld wire should be removed prior to the weld wire being wound onto a spool of weld wire. As such, when weld wire 40 is unwound from spool 50, as illustrated in FIG. 7, and subsequently cut and fed into a welding machine and through a welding gun during the welding operation, the weld wire has no retained shape memory characteristics. Consequently, as the weld wire is wound onto the spool, the weld wire adopts a shape during the winding process. Furthermore, as the weld wire is unwound from the spool, the weld wire adopts another shape. Further modifications to the shape of the "killed" weld wire occur when the weld wire is cut into sections, when the weld wire is slightly modified in shape by the operator, and as the weld wire is fed through the welding tip of the welder.

Figure 4:
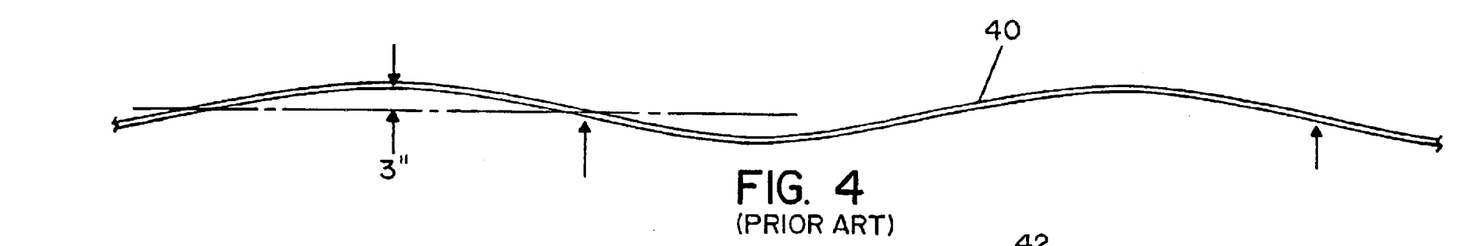
FIG. 4 illustrates the waveform shape of a "killed" prior art weld wire after it is being unwound from a spool.
Figure 4A:
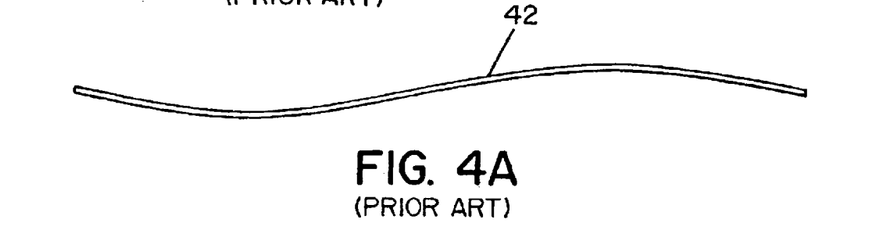
FIG. 4A illustrates the shape of a cut section of the weld wire of FIG. 4.
Figure 5:
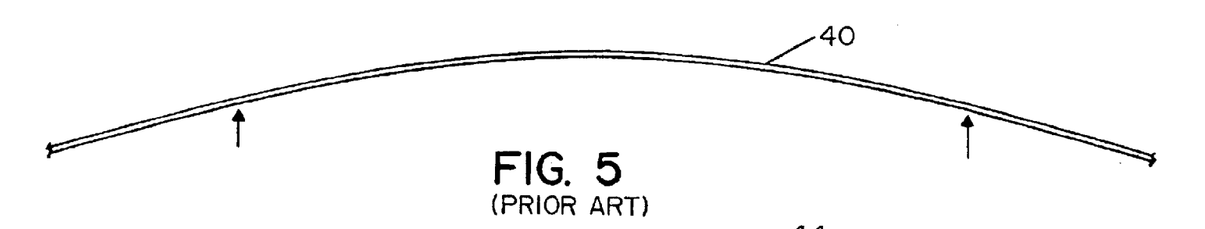
FIG. 5 illustrates the arcuate shape of another "killed" weld wire after it is being unwound from a spool.
Figure 5A:
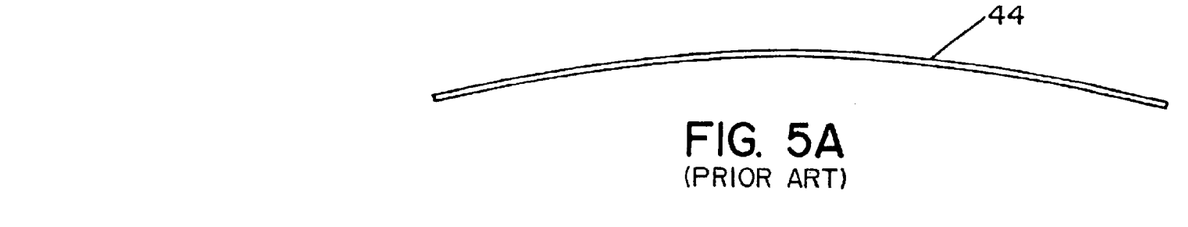
FIG. 5A illustrates a cut section of the "killed" weld wire of FIG. 5.
Figure 6:
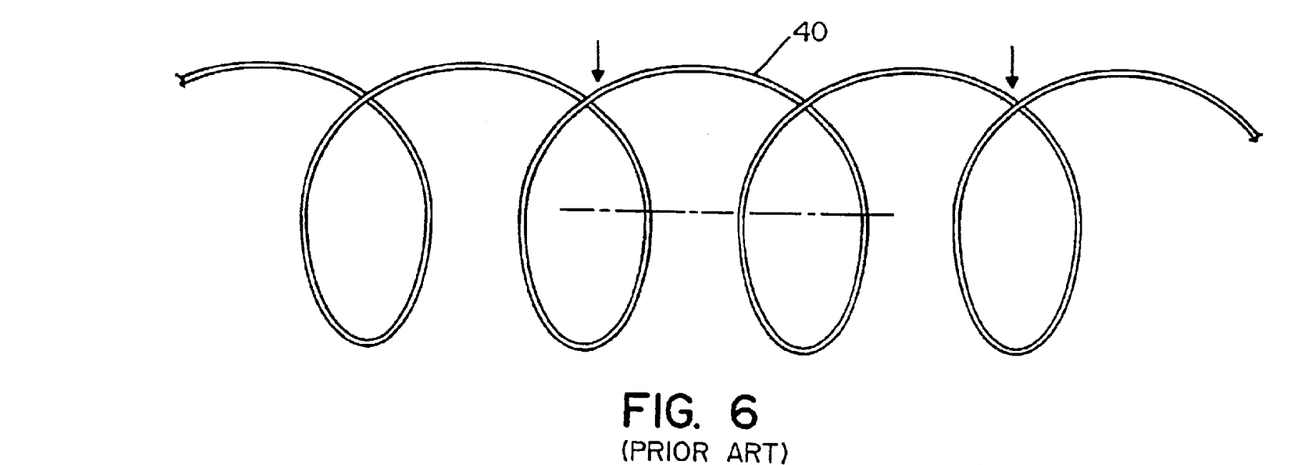
FIG. 6 illustrates the shape of another "killed" weld wire after it is being unwound from a spool.
Figure 6A:
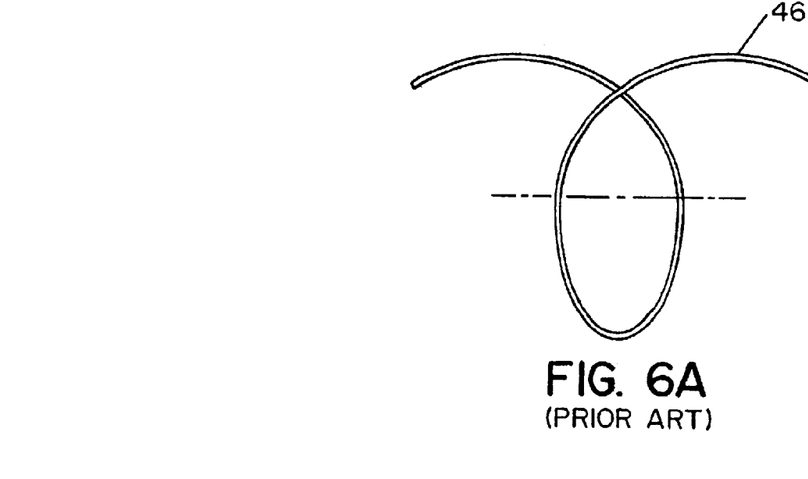
FIG. 6A illustrates the coiled shape of a cut section of the weld wire of FIG. 6.

Referring now to FIGS. 4–6, several prior art weld wires are illustrated. In FIG. 4, the shape of the unwound weld wire 40 from spool 50 is a waveform having an amplitude for each half cycle of about 3 inches. The plane in which the waveform lies for the weld wire is typically in multiple planes and has no consistency from one cycle to the next. FIG. 4A illustrates the shape of the weld wire when it is cut into a section 42 at the arrows indicated in FIG. 4. As shown in FIG. 4A, weld wire section 42 maintains substantially the same shape as the weld wire location from which it is cut. Referring now to FIG. 5, the unwound weld wire has a substantially arcuate shape. As with the weld wire in FIG. 4, the plane of the arcuate shape is typically in multiple planes and is not consistent along the longitudinal length of the weld wire. FIG. 5A illustrates the shape of the cut weld wire section 44 from the weld wire as shown in FIG. 5. This weld wire section retains a similar shape to the weld wire from which it is cut. Referring now to FIG. 6, the weld wire, as it is unwound from a spool, takes the form of a coil shape. The shape, size and plane in which the coils lie along the longitudinal length of the weld wire typically vary. As shown in FIG. 6A, a cut section of the weld wire 46 retains the same shape as the cut section of the weld wire as shown in FIG. 6. Since the weld wires of FIGS. 4–6 have no shape memory, the weld wire has inconsistent placement in the welding gun as the weld wire travels through the welding gun during the formation of the weld bead. As a result, the formed weld bead varies in placement during the welding operation as illustrated in FIGS. 1–3. In addition, the loss of memory of the weld wire makes the weld wire more susceptible to kinks or bends as the weld wire travels through the welding gun, thereby resulting in added inconsistent weld bead placement and the possibility of the formation of a low quality weld bead.

Figure 8:
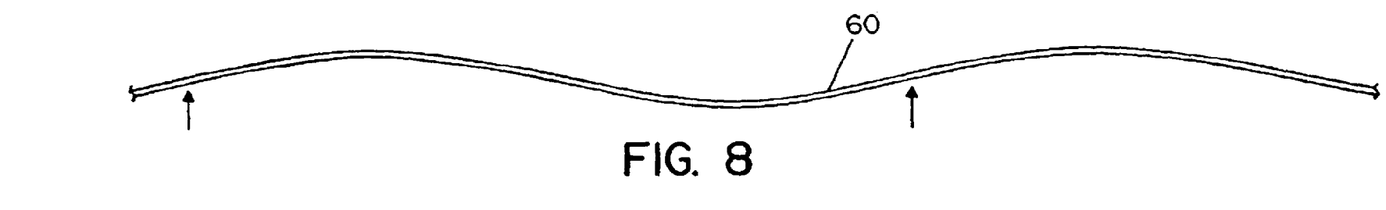
FIG. 8 illustrates the waveform of the shape memory weld wire of the present invention after it is being unwound from a spool.

Referring now to FIG. 8, the improved weld wire 60 having an imparted desired shape memory is illustrated. Weld wire 60 deviates from common industry practice by maintaining or creating shape memory in the weld wire as the weld wire is wound onto a spool of weld wire or prior to the weld wire being wound onto the spool of weld wire. As such, the weld wire has a desired shape memory when the weld wire is unwound from the spool of weld wire and fed through a welding gun. Surprisingly, it has been found that the use of a weld wire having shape memory results in the placement of a weld bead during the welding operation which is more consistent and of a higher quality than weld beads formed by a "killed" weld wire having little or no shape memory. The use of the shape memory weld wire also has been found to create a more robust weld bead during the welding process. In addition, the use of the shape memory weld wire reduces and/or eliminates the inconsistencies in the weld wire section shapes that previously were caused by inconsistencies in sections of weld wires cut by operators. In the past, weld wire without shape memory could be cut at various locations by the operator to help improve the shape of the weld wire thereby improving weld bead placement. However, the shape of the cut weld wire was not consistent from operator to operator and from section to section of the weld wire. As a result, the skill of the operator in forming the particular cut section of a weld wire affected the consistency of weld bead placement during the welding operation. The use of the shape memory weld wire of the present invention overcomes this inconsistency problem since similar cut weld wire sections have the same or similar shape, thereby eliminating the need for an operator to further modify the shape of the weld wire. As such, when the weld wire is fed through the contact tip of the welding gun, the weld wire will be similarly positioned relative to the welding tip, thus resulting in a more consistent weld bead placement during the welding operation.

The desired shape memory imparted onto the weld wire can be imparted onto the weld wire at the time the weld wire is formed and/or at a time subsequent to the weld wire being formed. The weld wire is typically informed by standard extrusion processes; however, other processes can be used. During the extrusion process, the weld wire has a shape memory imparted onto the weld wire. Typically, the shape memory has an inconsistent shape along the longitudinal length of the weld wire. As a result, the weld wire formed by the extrusion process is typically "killed," and the desired shape memory is subsequently imparted onto the weld wire by various other processes such as, but not limited to, a casting process. As can be appreciated, the desired shape memory can be imparted onto the weld wire during the extrusion process for the weld wire. Alternatively, the shape memory imparted onto the weld wire during the extrusion process can be fully or partially retained on the weld wire prior to the weld wire being subjected to a subsequent shaping process which imparts the desired shape memory onto the weld wire. Once the shape memory is imparted onto the weld wire, the weld wire is wound onto a spool of weld wire. The shape memory that is imparted onto the weld wire is fully or substantially retained in the weld wire as the weld wire is wound onto the spool and subsequently unwound from the spool prior to being cut and/or inserted and/or fed through a welding machine to form a weld bead onto a workpiece.

Figures 8A, 8B:
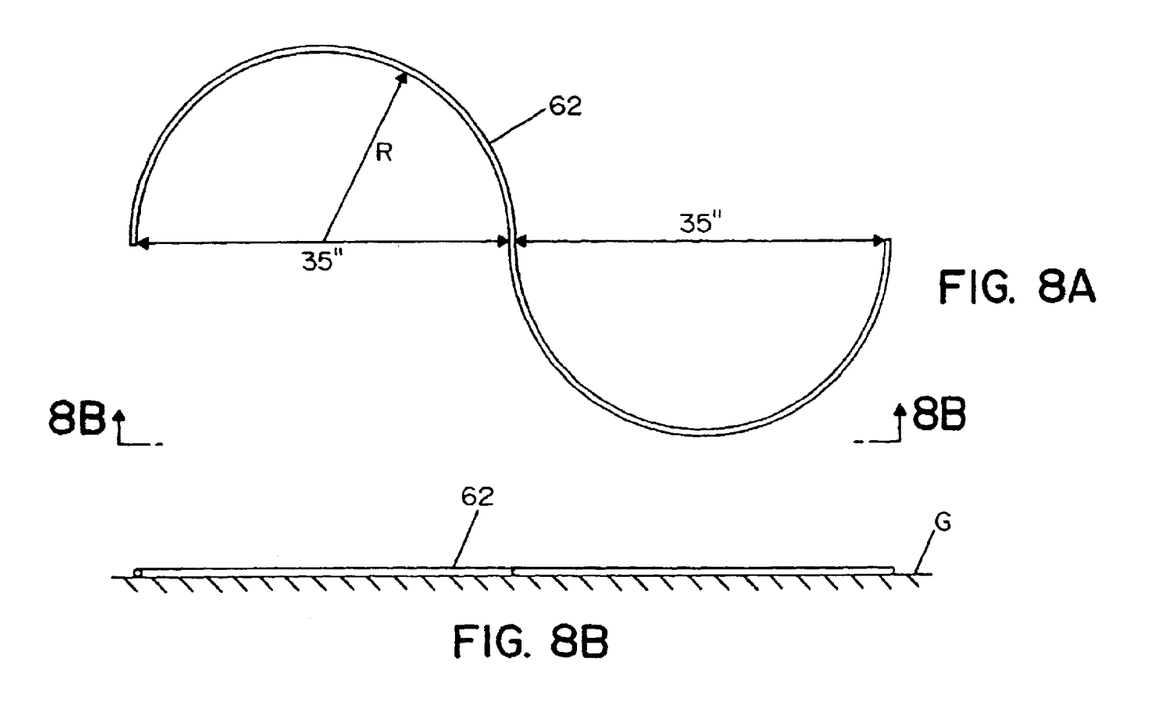
FIG. 8A illustrates the shape of the shape memory weld wire after it has been cut from the unwound weld wire of FIG. 8.
FIG. 8B is a cross-sectional view of the shape memory weld wire along lines 8B—8B of FIG. 8A.
Figure 11:
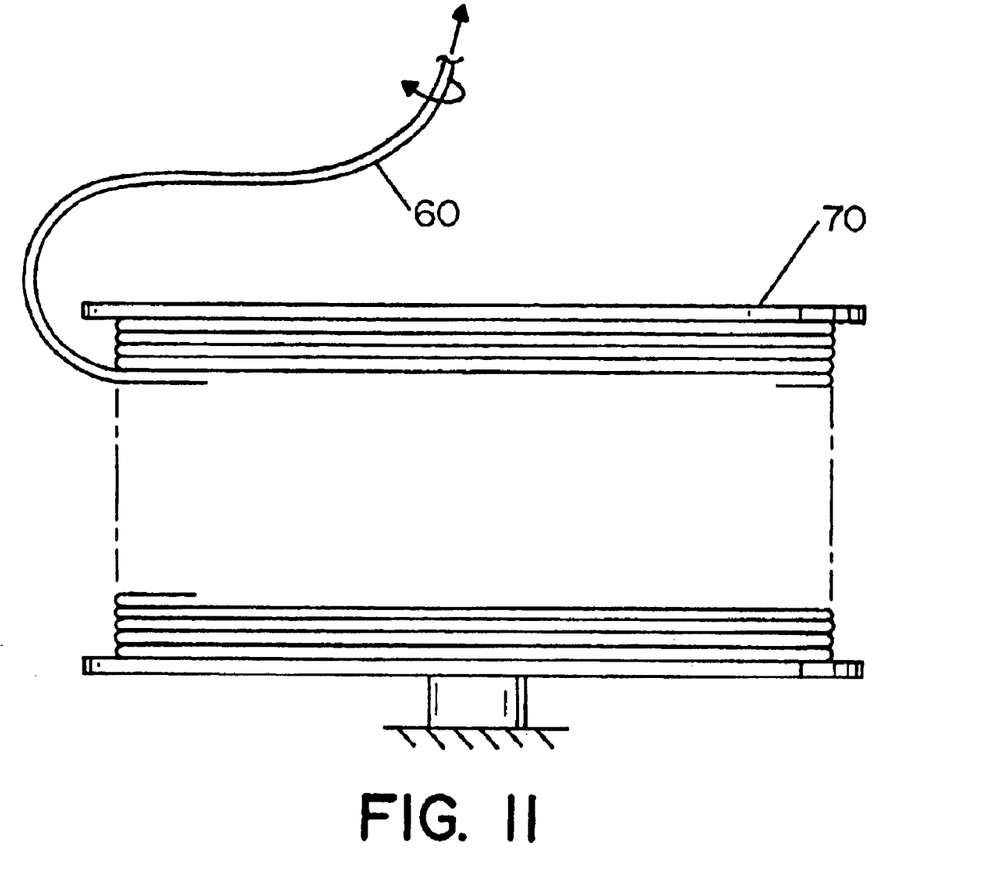

Referring again to FIG. 8, as weld wire 60 is unwound from the spool, the weld wire may or may not have a notable waveform. Indeed, the imparted memory shape onto the weld wire may substantially deviate from the waveform of the weld wire as it is unwound from the spool. As shown in FIG. 11, weld wire 60 is unwound from spool 70 while spool 70 is maintained in a non-rotatable position. An arm, not shown, is used to unwind weld wire 60 from the spool resulting in the shape of the weld wire, as shown in FIG. 8. During the unwinding process, the weld wire is typically under tension and does not revert back to its imparted shape until the weld wire is cut into a weld wire section 62, as illustrated in FIG. 8A. As shown in FIG. 8A, cut weld wire section 62 reverts back into a uniform waveform. The residual stress in weld wire 60 causes the cut weld wire section 62 to revert into the imparted memory shape. As shown in FIG. 8B, when the weld wire section 62 is laid upon a flat ground surface G, the imparted shape memory on the wire is substantially in one plane. As such, the weld wire section 62 substantially does not rise above the flat ground surface. Typically, the cut weld wire section 62 does not deviate from the flat ground surface by more than about 5 inches, more typically less than about 3 inches, still more typically less than about 2 inches, and even more typically less than about 1.5 inches. Deviations that are too large can result in inferior weld bead placement consistency. As shown in FIG. 8A, each half cycle of the waveform is substantially semi-circular and has a radius of about 35 inches. The maximum amplitude of the waveform for each half cycle is generally substantially the same throughout the length of the cut wire section. Typically, the maximum amplitude of each half cycle of the cut weld wire section varies less than about 6 inches, more typically less than about 4 inches, and still more typically less than about 2 inches. Although the maximum amplitude of each half cycle of the cut weld wire section is illustrated as being about 35 inches, other maximum amplitudes can be selected depending on the welding process. For most cut weld wire sections, the maximum amplitude of each half cycle is typically about 5–40 inches, more typically about 10–22 inches, and even more typically about 14–20 inches. As shown in FIGS. 8A and 8B, the length of each half cycle of the waveform of the cut weld wire section is substantially the same. Typically, the deviation of each half cycle will vary less than about 6 inches, more typically less than about 4 inches, still more typically less than about 2 inches, and even more typically less than 1.5 inches. In addition, the length of each cycle of a cut section of the weld wire typically is substantially the same. The length can vary somewhat based upon the position of the weld wire on spool 70 as it is unwound from spool 70; however, such deviation is typically small. Typically, the length of each cycle of the cut weld wire section varies less than about 15 inches, more typically less than about 10 inches, and still more typically less than about 5 inches. The length of each cycle of cut weld wire section can also vary depending on the position of the weld wire as it is unwound from the spool and/or on the diameter of the weld wire. The length of each cycle is typically less than about 150 inches, and more typically 40–120 inches, and even more typically 50–100 inches, and still even more typically 60–90 inches. Other lengths of the cycle can be used. As shown in FIG. 8A, the length of the weld cycle is approximately 70 inches, and the length of the weld wire forming the cycle is about 220 inches.

The waveform of the shape memory weld wire causes the weld wire to flip as the weld wire is fed through the welding tip of the welding gun. This flipping phenomenon results in the weld wire being in substantially the same position relative to the welding tip as the weld wire is fed through the welding tip, thereby resulting in a more consistent positioning of the weld bead during the welding process. For a weld wire having a maximum amplitude of about 14–20 inches and a cycle length of about 60–90 inches, the number of flips of the weld wire that can occur within 5–10 cycles is about 2–6. The number of flips of the weld wire is at least partially dependent on the maximum amplitude of the weld wire, the length of the cut section of the weld wire and the length of cycles of the weld wire.

Figures 9, 10:
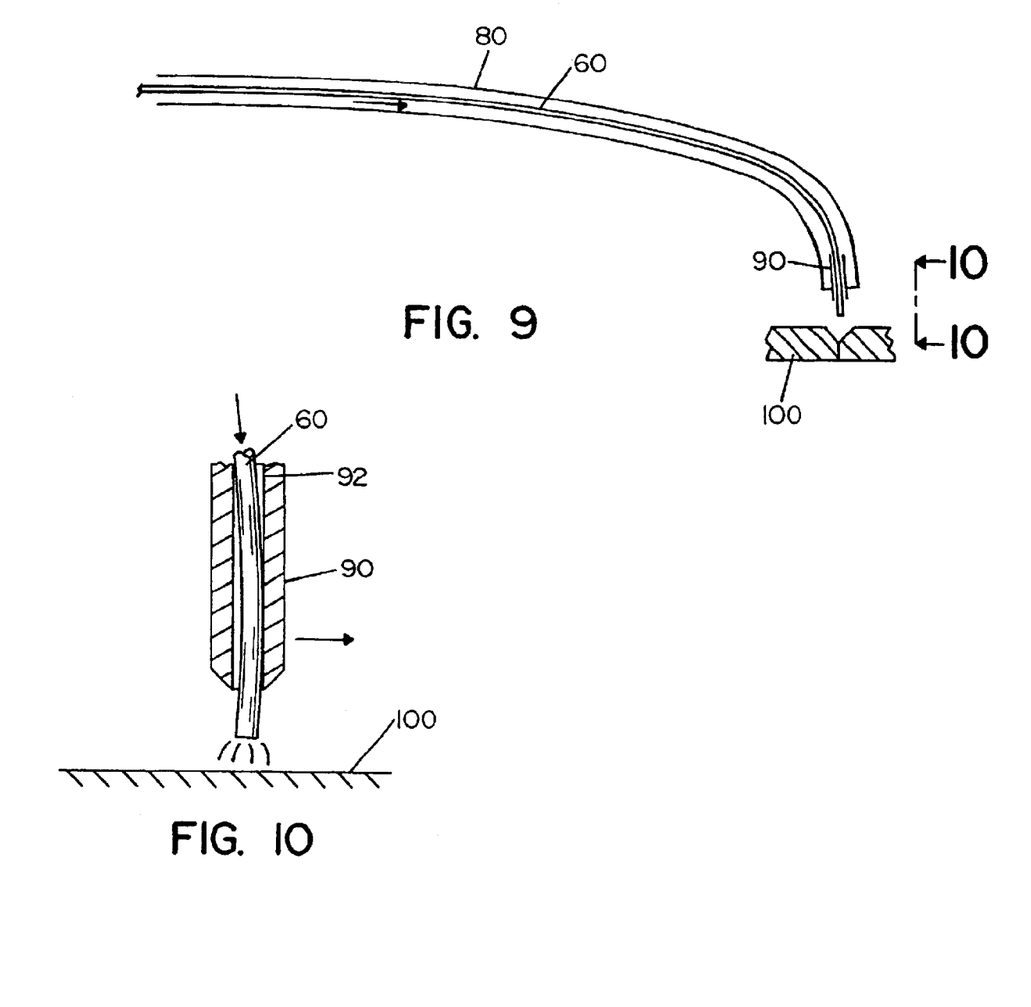
FIG. 9 illustrates the shape memory weld wire as it is directed through the tip of a welding gun onto a workpiece.
FIG. 10 is a cross-sectional view of the weld tip along lines 10—10 of FIG. 9; and, FIG. 11 illustrates the shape memory weld wire as it is being unwound from a spool.

Referring now to FIGS. 9 and 10, weld wire 60 is illustrated as being fed through weld gun 80 and through weld tip 90 onto workpiece 100. As weld wire 60 is fed through weld tip 90, the weld wire substantially maintains its position with respect to the welding tip, thereby forming a more consistently positioned weld bead. As shown in FIG. 10, weld wire 60 engages passageway 92 of weld tip 90 thereby causing friction between the weld wire and passageway. This friction results in increased melting point friction which imparts heat onto the weld wire thereby facilitating in the melting of the weld wire during the formation of the weld bead. Weld wire that is "killed" is merely reshaped in the welding tip, thus resulting in little melting point friction. The shape memory of weld wire 60 resists being reshaped by the welding tip, thus resulting in greater melting point friction being generated as the weld wire passes through the welding tip.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

Having thus defined the invention, the following is claimed:

1. A method of forming a weld wire for storage on a spool, said method comprising:
    (a) extruding said weld wire;
    (b) substantially removing memory from said weld wire;
    (c) forming a substantially linear fast in said weld wire, said substantially linear cast in the form of an undulating curve generally in a single plane, said substantially linear cast having a generally fixed radius of curvature in the range of about 15–40 inches; and,
    (d) winding said wire having a substantially linear cast on said spool, said wire at least partially retaining said substantially linear cast after said weld wire is subsequently unwound from said spool.

2. The method as defined in claim 1, wherein said undulating curve has a generally fixed radius of curvature.

3. The method as defined in claim 2, wherein said undulating curve is a succession of generally semi-circular sections.

4. The method as defined in claim 1, wherein said undulating curve is a succession of generally semi-circular sections.

5. A method of forming a weld wire for storage on a spool, said method comprising:
    (a) forming said weld wire; and,
    (b) imparting a desired shape memory on said weld wire, said weld wire having said shape memory imparted on said weld wire at least partially prior to said weld wire being wound on said spool, said shape memory substantially lying in a single plane wherein said shape memory is generally a waveform having a maximum amplitude for each half cycle, said half cycle having a radius of curvature of at least about 15 inches.

6. The method as defined in claim 5, wherein said weld wire is at least partially formed by an extrusion process.

7. The method as defined in claim 5, wherein said desired shape memory is at least partially retained on said weld wire after said weld wire is unwound from said spool.

8. The method as defined in claim 5, wherein said desired shape memory is at least partially imparted on said weld wire by a casting process.

9. The method as defined in claim 5, including the step of at least partially removing the shape memory on said weld wire resulting from said forming of said weld wire prior to imparting said desired shape memory on said weld wire.

10. The method as defined in claim 5, wherein said desired shape memory is a waveform.

11. The method as defined in claim 10, wherein said waveform has substantially the same maximum amplitude for each half cycle of a full waveform.

12. The method as defined in claim 10, wherein each half cycle of said waveform is substantially semi-circular.

13. The method as defined in claim 5, wherein said desired shape memory is at least partially retained on said weld wire as said weld wire passes through a welding tip of a welding machine.

14. A method of forming a weld wire for storage on a spool, said method comprising:

(a) forming said weld wire; and, (b) at least partially imparting a desired shape memory on said weld wire prior to said weld wire being wound on said spool, said desired shaped including a substantially linear cast in the form of a waveform generally in a single plane along a longitudinal length of said weld wire, said cast having a generally fixed radius of curvature of at least about 5 inches, said shape memory at least partially retained on said weld wire after said weld wire is unwound from said spool.

15. The method as defined in claim 14, wherein said waveform having a half cycle of up to about 60 inches.

16. The method as defined in claim 14, wherein said waveform having a maximum amplitude for each half cycle of up to about 40 inches.

17. The method as defined in claim 14, wherein said waveform having a maximum amplitude for each half cycle, said maximum amplitude of each half cycle having a deviation of less than about 6 inches within one cycle of said weld wire.

18. The method as defined in claim 17, wherein said deviation of said maximum amplitude of each half cycle within one cycle is less than about 4 inches.

19. The method as defined in claim 14, wherein said waveform including half cycles having substantially the same maximum amplitude for each half cycle.

20. The method as defined in claim 14, wherein said waveform is a succession of generally semicircular sections.

21. The method as defined in claim 20, wherein said waveform having a half cycle of up to about 60 inches.

22. The method as defined in claim 21, wherein said waveform having a maximum amplitude for each half cycle of up to about 40 inches.

23. The method as defined in claim 22, wherein said waveform having a maximum amplitude for each half cycle, said maximum amplitude of each half cycle having a deviation of less than about 6 inches within one cycle of said weld wire.

24. The method as defined in claim 23, wherein said deviation of said maximum amplitude of each half cycle within one cycle is less than about 4 inches.

25. The method as defined in claim 24, wherein said waveform including half cycles having substantially the same maximum amplitude for each half cycle.

* * * * *

(12) INTER PARTES REEXAMINATION CERTIFICATE (483rd)
United States Patent
Ferguson, III et al.

(10) Number: US 6,820,454 C1
(45) Certificate Issued: Oct. 31, 2012

(54) "S" SHAPED CAST IN WIRE (75) Inventors: Otto Ferguson, III, Oakwood Village, OH (US); Dennis K. Hartman, Olmsted Township, OH (US)

(73) Assignee: Lincoln Global, Inc., Monterey Park, CA (US)

Reexamination Request:
No. 95/000,622, Apr. 15, 2011

Reexamination Certificate for:
Patent No.: 6,820,454
Issued: Nov. 23, 2004
Appl. No.: 10/633,215
Filed: Aug. 1, 2003

Related U.S. Application Data (62) Division of application No. 10/107,499, filed on Mar. 26, 2002, now Pat. No. 6,708,864.

(60) Provisional application No. 60/298,555, filed on Jun. 15, 2001.

(51) Int. Cl.
*B21C 19/00* (2006.01)
*B21C 47/26* (2006.01)
*B21C 23/00* (2006.01)
*B21F 1/00* (2006.01)
*B21F 1/04* (2006.01)
*B23K 35/00* (2006.01)
*B23K 35/40* (2006.01)
*B23K 9/133* (2006.01)
*B23K 35/02* (2006.01)

(52) U.S. Cl. .................. 72/256; 72/371; 72/79

(58) Field of Classification Search .................. None
See application file for complete search history.

(56) References Cited

To view the complete listing of prior art documents cited during the proceeding for Reexamination Control Number 95/000,622, please refer to the USPTO's public Patent Application Information Retrieval (PAIR) system under the Display References tab.

*Primary Examiner* — Patricia Engle (57) ABSTRACT

A weld wire for storage on a spool of weld wire. The weld wire has a substantially linear cast in the form of an undulating curve that generally lies in a single plane. The undulating curve is a succession of generally semi-circular sections having a generally fixed radius of curvature. The linear cast is formed on the weld wire prior to the weld wire being wound on the spool of weld wire. The linear cast is at least partially retained on the weld wire after the weld wire is unwound from the spool and during the feeding of the weld wire through a welding machine.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-25 is confirmed.

\* \* \* \* \*